Patented Mar. 15, 1949

2,464,693

UNITED STATES PATENT OFFICE 2,464,693

SYNTHETIC LINEAR POLYCARBONAMIDES

William Kirk, Jr., and Richard Seyfarth Schreiber, Wilmington, Del., assignors to E. I. du Pont de Nemours & Company, Wilmington, Del., a corporation of Delaware No Drawing. Application April 3, 1945,
Serial No. 586,447

2 Claims. (Cl. 260—78)

This invention relates to polyamides and more particularly to fiber-forming synthetic linear polyamides.

Linear fiber-forming synthetic polyamides (nylons) of the type discussed in U. S. Patents 2,071,250, 2,071,251 and 2,130,948 have great utility particularly in the production of filaments by melt spinning for use in fabrics. Such polyamides are not soluble in the usual organic solvents and the preparation of films from such polymers is difficult. While these polyamides do not absorb water to the extent that cuprammonium and viscose rayons do, they do absorb water to an extent (usually above 5%) which is undesirable for some purposes, and do not have the stiffness or transparency which are desirable for certain applications. Certain interpolyamides which have been previously prepared and which are sufficiently soluble to be employed in the casting of film from certain solutions have a very high water absorption and relatively low stiffness, especially when wet. These polymers are accordingly not preferred for many applications involving films or fibers.

This invention has as an object the provision of synthetic linear polyamides which are soluble in readily available volatile solvents such as mixtures of alcohols and halogenated methanes. A further object is the provision of soluble polyamides having low water absorption and high stiffness values. Other objects will appear hereinafter.

These objects are accomplished by the following invention which comprises synthetic linear polyamides containing in the chain recurring groups of the type:

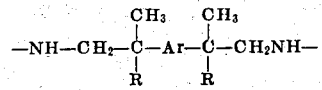

in which R is selected from the class of hydrogen and methyl and Ar is an arylene radical corresponding to an aromatic hydrocarbon selected from the class consisting of benzene, naphthalene, biphenyl, bibenzyl and diphenylmethane. Since Ar is arylene the two free valences belong to the nuclei.

The polyamides of this invention are synthetic linear polyamides which have an intrinsic viscosity of at least 0.4 and a unit length of at least 7 as defined in U. S. P. 2,071,254 and U. S. P. 2,130,948.

For the practice of this invention (the provision of polyamides having the desired novel combination of properties) at least 50% of the amide groups in the polyamides should be derived from diamines of the formula

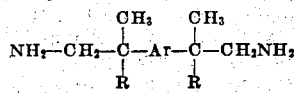

in which R and Ar have the values previously indicated. Thus, interpolyamides in which a substantial amount of the above compounds may be employed include, for example, those resulting from the condensation of the above type of diamine with a dibasic acid in the presence of minor amounts of a polymerizable lactam such as caprolactam, or minor amounts of other polyamide-forming diamines. These polyamides are obtained by the reaction of linear polymer-forming compositions containing bifunctional groups which are complementary to reactive amide-forming groups in other molecules. On hydrolysis by dilute acids such as dilute hydrochloric acid, there are obtained from the polyamides of this invention substantial amounts of the acid salts of the diamines of the formula previously given and at least one dicarboxylic acid. From interpolyamides there may be obtained salts of other diamines and other dicarboxylic acids.

A preferred method of obtaining the polyamides of this invention consists in mixing essentially molecular equivalent amounts of a dibasic acid and the above-mentioned type of diamine, for example, bis(amino-t-butyl)biphenyl, in an alcoholic solution. The resulting salt formed is separated by filtration and the salt heated at temperatures of usually 200-300° C. in an inert atmosphere or under vacuum for several hours to obtain the macromolecular fiber-forming polyamide.

The more detailed practice of this invention is illustrated by the following examples wherein parts given are by weight. There are, of course, many forms of the invention other than these specific embodiments.

Example I

This example describes the preparation and properties of the preferred polyamide from sebacic acid and bis(amio-t-butyl).biphenyl.

Essentially equivalent amounts of bis(amino-t-butyl) biphenyl and sebacic acid dissolved in warm ethanol were mixed and the resulting insoluble salt was separated by filtration. The salt was heated in an evacuated, sealed reaction vessel at 220° C. for one and one-half hours. The reaction vessel was then vented to reduce the internal pressure to atmospheric and heating was continued at 285° C. for three hours while a slow stream of nitrogen was passed over the surface of the melt. The reaction vessel was then evacuated to about 5 mm. of mercury pressure and heating was continued at 285° C. for seven hours. The clear, viscous melt cooled to a tough, clear, manually spinnable solid which had a softening temperature on a metal block of about 175° C. and an intrinsic viscosity in m-cresol of 0.93 when measured as described in U. S. Patent 2,130,948 and a molecular weight in excess of 3500.

The polyamide was readily soluble in chloroform or methylene chloride or their mixtures with methanol. A transparent, tough film cast from such a solution exhibited the following physical properties:

Tensile strength _____lbs./sq. in__ 8000
Film stiffness, M×10⁻⁶, lb./sq. in. (Tinius-Olsen test):
    50% relative humidity_____ 0.30
    Wet _____ 0.28
Water absorption_____per cent__ 2.9
Dimensional swelling in water_____do____ 0.40

Filaments prepared by extrusion of the molten polymer through a suitable orifice were readily drawn to four to five times the original length, the drawn filaments having a tenacity of about three grams per denier with a break elongation of 16–20%. Filament stiffness (E×10⁻⁶ lb./sq. in.) was 0.70 at 50% relative humidity and 0.69 after soaking in water for twenty-four hours.

In contrast to this polymer the closest homolog known to the art is the polyamide from bis-(p-aminoethyl)-benzene and sebacic acid which is essentially insoluble in the above mentioned solvents and which is less stiff and more water sensitive as shown in the following table.

Filament stiffness, E×10⁻⁶, lb./sq. in.:
    50% relative humidity _____ 0.59
    Wet _____ 0.43
Water absorption_____per cent__ 3.6

Example II

This example describes the preparation of the polyamide from bis(amino-t-butyl)biphenyl and adipic acid.

The salt prepared as in Example I by mixing equivalents of bis(amino-t-butyl)biphenyl and adipic acid was heated at 285° C. under nitrogen at atmospheric pressure for two hours. Heating at 285° C. was then continued for five hours at a pressure of about 5 mm. of mercury. The clear, viscous melt cooled to a transparent, tough solid which could be manually spun into filaments which were readily cold-drawable. The polymer softened at about 175° C. and was soluble in chloroform. Clear, transparent film were obtained by casting technique.

Example III

This example describes the preparation of the polyamide from bis(beta-aminoisopropyl)biphenyl and sebacic acid.

A mixture of equivalent weights of bis(beta-aminoisopropyl)biphenyl and sebacic acid was heated for three hours at 220° C. in an evacuated sealed reaction vessel. Heating was continued for one hour at 285° C. under an atmosphere of nitrogen at atmospheric pressure and for an additional six and one-half hours at 285° C. at a pressure of about 5 mm. of mercury. The resulting transparent, manually spinnable polyamide was soluble in chloroform-methanol mixtures.

Example IV

This example describes the preparation of the polyamide from bis(amino-t-butyl)bibenzyl and sebacic acid.

The salt prepared from bis(amino-t-butyl)bibenzyl and sebacic acid was heated at 285° C. at atmospheric pressure under nitrogen for one and one-half hours and then for three hours at 285° C. at a pressure of about 5 mm. of mercury. The clear, viscous melt cooled to a tough, transparent solid softening at 150° C. on a metal block. The polymer could be hot pressed to a clear, tough film and was soluble in chloroform-methanol mixtures.

Example V

This example describes the preparation of the polyamine from bis(amino-t-butyl)benzene and sebacic acid.

The salt prepared from bis(amino-t-butyl)benzene and sebacic acid was heated in an evacuated, sealed reaction vessel for three and one-half hours at 210–215° C. The reaction vessel was then vented to atmospheric pressure and heating was continued for one hour at 285° C. under an atmosphere of nitrogen. The clear, viscous melt was then heated for six hours at 285° C. under a mercury pressure of about 5 mm. The resulting tough, colorless polyamide was manually spinnable, softened at about 140° C. and was readily soluble in chloroform.

The above examples disclose the preparation of polyamides by the condensation of dibasic acids with bis(beta-amino-alpha-alkyl ethyl)aromatic hydrocarbons. The invention includes within its scope the preparation of interpolyamides in which a minor proportion of the amide groups are derived from amine components other than the specific ones mentioned. To obtain the properties of solubility, stiffness and low water absorption in the polyamide it is preferred that at least 50% of the amide groups be derived from the previously described arylene compounds. Thus, this invention includes such interpolyamides as the following in which the amine component in (A) is present in larger amounts on an equivalent basis than the amine component in (B).

| | (A) | (B) |
|---|---|---|
| 1 | bis(Amino-t-butyl)benzene/sebacic acid | Caprolactam |
| 2 | bis(Amino-t-butyl)biphenyl/adipic acid | Hexamethylenediamine/adipic acid |
| 3 | bis(Amino-t-butyl)biphenyl/adipic acid | Hexamethylenediamine/adipic acid/caprolactam |
| 4 | bis(Amino-t-butyl)biphenyl/sebacic acid | Hexamethylenediamine/adipic acid; and/or hexamethylenediamine/sebacic acid |

In the diamines that are used in the preparation of the polyamides of this invention the arylene radical is preferably a 1,4-diradical. The new diamines having two beta-amino-alpha-alkyl ethyl groups are readily prepared by reacting the aromatic compound for example benzene, biphenyl, bibenzyl, diphenylmethane or naphthalene with at least a two-fold molecular amount of a terminal methylene $C_3$–$C_4$ alkenyl monoamine having at least one and preferably two hydrogens on the amino nitrogen and having the unsaturation between the beta and gamma carbons in the presence of a polyvalent element halide Friedel-Crafts catalyst such as aluminum chloride. Further details are given in our copending application Serial No. 586,446 filed of even date herewith. The amine-forming reaction is usually carried out in the presence of an inert solvent at temperatures of 20–80° C. and the diamine is separated by treating the reaction mixture with water, separating the solvent and adding an excess of an alkali. Further details of this are disclosed in our copending application filed of even date herewith.

It is preferred that the polyamides be obtained by reacting the above described type of diamine with a dibasic acid having at least three carbons between carboxylic acid groups and preferably less than twenty carbon atoms, for example, adipic acid, pimelic acid, suberic acid, sebacic acid, terephthalic acid, etc. The preferred dibasic acids are adipic and sebacic acids.

Polyamides obtained by the use of other diamines have not been found to have the novel combination of properties shown by the polyamides of this invention. Thus, polyamides derived from the, at first glance, closely related diamine

(cf. U. S. P. 2,312,966) are not soluble in such solvents as chloroform or chloroform-mechanol mixtures.

The many advantages in employing solutions of polyamides in which the solvent is readily volatile, cheap and relatively nontoxic are numerous. Thus, films can be obtained by casting of the solutions and fibers by dry spinning. The solvents of the above type are preferred to solvents such as phenol or formic acid which must be employed for polyamides most readily available, e. g., polyhexamethyleneadipamide. The following table illustrates the difference in properties of one of the polyamides of this invention (last item) as compared to prior art polyamides:

tended to be illustrative only. Any modification thereof or variation therefrom which conforms to the spirit of the invention is intended to be included within the scope of the claims.

What is claimed is:

1. A synthetic linear polycarbonamide characterized by an intrinsic viscosity of at least 0.4, solubility in methanol-chloroform mixtures and by a predominance of recurring units of the formula

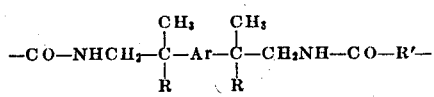

wherein R is of the class consisting of hydrogen and methyl, R' is a bivalent hydrocarbon radical having a chain of 3 to 19 carbons between its free valences and Ar is a bivalent arylene hydrocarbon radical having its valences stemming from nuclear carbons and selected from the class consisting of arylene radicals derived, by abstraction of two hydrogens, from benzene, naphthalene, biphenyl, bibenzyl, and biphenylmethane.

2. A synthetic linear polycarbonamide characterized by an intrinsic viscosity of at least 0.4, solubility in methanol-chloroform mixtures, hav-

| Polyamide | Solubility in $CHCl_3$—$CH_3OH$ | Stiffness $E \times 10^{-4}$ lb./sq. in. at— | | Water Absorption, per cent | Softening Point, °C. |
|---|---|---|---|---|---|
| | | 50% R. H. | Wet | | |
| Polyhexamethylene adipamide | Insoluble | 0.45 | 0.17 | 9.0 | 264 |
| Polyhexamethylene sebacamide | do | 0.45 | 0.28 | 3.9 | 220 |
| Polyhexamethylene-adipamide/polyhexamethylenesebacamide/caprolactam interpolymer | soluble | 0.10 | 0.05 | 10.5 | 145 |
| p-bis(2-Aminoethyl) benzene-sebacic acid polymer | insoluble | 0.59 | 0.43 | 3.6 | 285 |
| bis(Amino-t-butyl)-biphenyl-sebacic acid polymer | soluble | 0.70 | 0.69 | 2.0–3.0 | 175 |

In the above table the water absorption was measured on undrawn films or filaments while the stiffness was measured on drawn filaments.

The polyamides of this invention are utilized in the form of filaments, for example, bristles or fabrics where stiffness is desired. They are also useful for moldings and coating compositions. Clear films which can be readily prepared by the evaporation of solution of these polyamides are particularly useful in photographic applications.

The above description and examples are ining a predominance of and at least seven recurring units of the formula

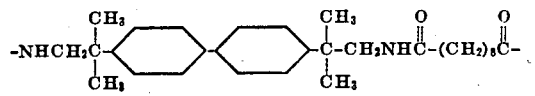

WILLIAM KIRK, Jr.
RICHARD SEYFARTH SCHREIBER.

REFERENCES CITED

The following references are of record in the file of this patent:

UNITED STATES PATENTS

| Number | Name | Date |
|---|---|---|
| 2,312,966 | Hanford | Mar. 2, 1943 |

Certificate of Correction

Patent No. 2,464,693.

March 15, 1949.

WILLIAM KIRK, Jr., ET AL.

It is hereby certified that errors appear in the printed specification of the above numbered patent requiring correction as follows:

Column 2, line 41, Example 1, for "amio" read *amino*; column 3, line 13, for "Filments" read *Filaments*; line 47, for the word "film" read *films*; line 48, for "technique" read *techniques*; column 4, line 7, for "polyamine" read *polyamide*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*